United States Patent [19]

Appel

[11] Patent Number: 5,278,400
[45] Date of Patent: Jan. 11, 1994

[54] MULTIPLE THRESHOLD ENCODING OF MACHINE READABLE CODE

[76] Inventor: James J. Appel, 87 Bradford Rd., Brighton, N.Y. 14618

[21] Appl. No.: 742,965

[22] Filed: Aug. 19, 1991

[51] Int. Cl.$^5$ .......................... G06K 19/06; G06K 7/10
[52] U.S. Cl. .................................. 235/494; 235/454; 235/456; 358/429; 358/455
[58] Field of Search ............... 235/494, 454, 456, 460, 235/465; 358/429, 455

[56] References Cited

U.S. PATENT DOCUMENTS

| | | | |
|---|---|---|---|
| 4,708,920 | 11/1987 | Orensteen et al. | 430/11 |
| 4,788,598 | 11/1988 | Ochi et al. | 358/429 |
| 4,790,566 | 12/1988 | Boissier et al. | 283/91 |
| 4,822,986 | 4/1989 | Guthmueller et al. | 235/456 |
| 4,939,354 | 7/1990 | Priddy et al. | 235/456 |
| 5,008,950 | 4/1991 | Katayama et al. | 358/455 |

FOREIGN PATENT DOCUMENTS 0096220 12/1983 European Pat. Off. ............ 358/455

*Primary Examiner*—Donald Hajec
*Assistant Examiner*—Esther Chin

[57] ABSTRACT

A method and apparatus for applying coded data to a substrate and decoding the data in which the data are encoded in cells having a determined number of pixels. The pixels are coded, preferably by binary printing, in accordance with the number of coded pixels and not their position. In decoding of the cells, the gray scale levels of the pixels are sensed, and converted to digital signals. The digital signals are summed, for all of the pixels of the cell, and compared with multiple threshold levels in order to recover the data.

8 Claims, 3 Drawing Sheets

MULTIPLE THRESHOLD ENCODING OF MACHINE READABLE CODE

FIELD OF THE INVENTION

This invention relates to a method and apparatus for the recording and reading of encoded digital data on hardcopy recording media and, more particularly, to the use of codes composed of a plurality of cells each having a plurality of pixels.

BACKGROUND OF THE INVENTION

Plain paper is a favored recording medium for storing and transferring human readable information, and the emergence of electronic document processing systems has enhanced the functional utility of plain paper and other types of hardcopy documents by enabling the application of machine readable digital data thereon. This machine readable data enables the hardcopy document to actively interact with such a document processing system in a variety of different ways when the document is scanned into the system by an ordinary input scanner. See, for example, the copending and commonly assigned U.S. patent applications of Frank Zdybel, Jr. et al. and Walter A. L. Johnson et al., which were filed May 30, 1990 on "Hardcopy Lossless Data Storage and Communications for Electronic Document Processing Systems" (D/89190) and on "Form and System Utilizing Encoded Indications for Form Field Processing" (D/90003), respectively.

As a general rule, digital data is recorded by writing two dimensional marks on a recording medium in accordance with a pattern which encodes the data either by the presence or absence of marks at a sequence of spatial locations or by the presence or absence of mark related transitions at such locations. Ordinary magnetic and optical digital data recording conform to this style of encoding.

In a prior method and apparatus for encoding machine readable information on a paper document, as disclosed for example in copending U.S. patent application Ser. No. 07/560,514 filed July 31, 1990 "Self-clocking Glyph Shape Codes", Bloomberg et al, the contents of which are incorporated by reference herein, an encoded pattern is scanned by a CCD input scanner, digitized, and binary thresholded. In binary thresholding methods, all printed pixels with a digitized value greater than the threshold are interpreted as being 0's, and all printed pixels with a digitized value equal to or less than the threshold value are interpreted as 1's. In the above system, the encoding methods thus use binary thresholding of the signal read from the encoded pattern. For example, if a pattern consists of 16 printed pixels for each encoded bit, the digitized CCD output of the scanner is binary thresholded, and then the interpreting algorithm determines whether the 16 pixel cell has an 8 pixel black slash in it. If there is no slash, the pattern is interpreted as encoding a 0. The above system also suggests an encoding scheme wherein slashes of different directions are used to differentiate between a 0 and a 1. In such arrangements, the analog output is digitized and then binary thresholded.

An example of the encoding system of the above system is shown in FIG. 6 wherein each cell of the image is a 4×4 matrix of pixels. The encoding of each cell consists in defining a diagonal marking in the cell, in the form of black image of 8 pixels, in a rotationally dependent manner. Accordingly, a cell having such a properly oriented marking corresponds to a 1, whereas a cell with no darkened pixels corresponds to a 0. With this encoding, it is apparent that the illustrated 8 cells (128 pixels) of FIG. 6 corresponds to binary 01111001, or decimal 121.

While the provision of a hardcopy in which pixels of an image may intentionally have more than two gray levels is known, for example in U.S. Pat. Nos. 4,788,598 and 4,790,566, such techniques are not employed in a manner to reduce the area of the hard copy that must be employed for encoding functions.

SUMMARY OF THE INVENTION

The present invention is directed to the provision of a method and apparatus for encoding and decoding of data on a hardcopy, that enables the efficient and reliable recovery of the data while employing a minimum area of the hard copy.

Briefly stated, in accordance with the invention, a method and apparatus are provided for encoding data on a substrate and decoding the coded data, wherein the data is in the form of a plurality of cells on the substrate, and each cell has a predetermined number of pixel locations. The encoding is effected by marking a number of the pixels, preferably by binary marking, the number corresponding to the data to be encoded. The relative location of the marked pixels in a cell does not constitute a part of the encoding.

In order to decode the markings on the substrate, the gray scale level at each pixel of the cell is detected and converted to a corresponding digital signal. The digital signals corresponding to all of the pixels in the cell are summed.

A plurality of different threshold levels are established dividing the maximum range of possible sums into subranges, and the sum of the digital signals is compared with the threshold values to determine the subrange within which the sum falls. The threshold levels are set so that the subranges correspond to the expected sums when corresponding numbers of pixels are marked. Accordingly, a signal corresponding to a determined subrange is output, to correspond to the encoding of the cells.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
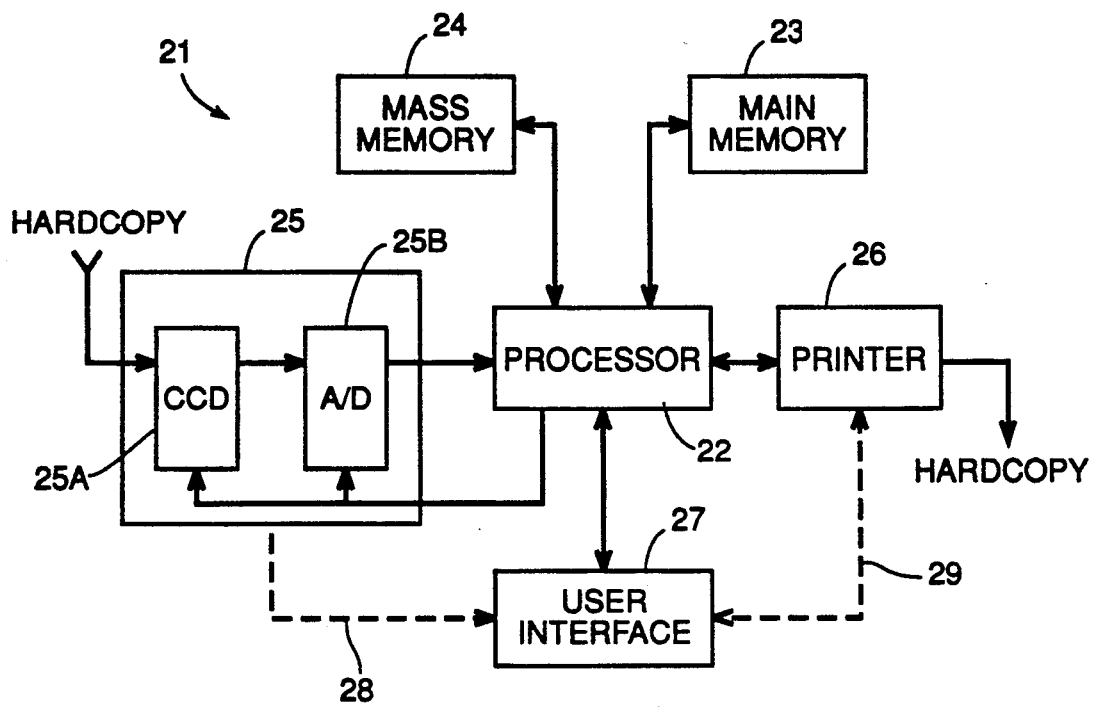
FIG. 1 is a simplified block diagram of an electronic document processing system for carrying out and taking advantage of the various aspects of the present invention.

Referring now to the drawings, FIG. 1, illustrates an electronic document processing system 21 which may constitute a typical environment for this invention. In keeping with standard practices, the document processing system 21 comprises a digital processor 22 having a main memory 23 and a mass memory 24, an input scanner 25 for scanning digital representations of selected hardcopy documents into the processor 22, and a printer 26 for printing hardcopy renderings of selected ones of the files that are listed on a file directory (not shown) of the processor 22. A user interface 27 is provided for enabling a user to interact with the processor 22, the input scanner 25, and the printer 26. The processor 22 sets operations including setting thresholds, summing digital signals, and comparing the sum to the thresholds.

The user interface 27 collectively represents the input devices through which the user enters control instructions for the input scanner 25 and for the printer 26, as well as the image editing and manipulation instructions for the processor 22. Additionally, the interface 27 represents the output devices through which the user receives feedback with respect to the actions that are taken in response to the instructions that are entered by the user or otherwise, such as under program control. For example, the user interface 27 generally includes a keyboard or the like for entering user instructions, a monitor for giving the user a view of the process that is being performed by the processor 22, and a cursor controller for enabling the user to move a cursor for making selections from and/or for entering data into a process that is being displayed by the monitor. Since these components are conventional they are not illustrated herein.

The illustrated document processing system 21 is centralized, so it has been simplified by assuming that all control instructions and all image editing and manipulation instructions are executed by the processor 22 under program control. In practice, however, the execution of these instructions may be handled by several different processors, some or all of which may have their own main memory and even their own mass memory. Likewise, either or both of the input scanner 25 and the printer 26 may have its own user interface, as indicated by the dashed lines 28 and 29, respectively. Indeed, it will be evident that the document processing system 21 could be reconfigured to have a distributed architecture to operate with a remote input scanner and or a remote printer (not shown). Data could be transferred from and to such remote scanner and printer terminals via dedicated communication links or switched communication networks (also not shown).

The input scanner 25 may include a CCD 25A for scanning a hardcopy input document. The CCD is controlled by the processor 22 to selectively apply its outputs, corresponding to the different printed pixels, to an A/D converter 25B. The digital outputs from the A/D are stored in a memory of the system. The scanner is controlled by the program of the processor to scan the image of each hardcopy input document at a predetermined spatial resolution of, say, 300 s.p.i.×300 s.p.i. (spots/inch). In operation, the CCD 25A converts the gray level of the individually resolved picture elements (commonly called "pixels" or "pels") of the scanned image into corresponding analog values and the A/D converts these values to digital values for application to the processor and suitable storage. For the purposes of this example, it is assumed that the printed pixel spatial resolution is equal to the CCD pel resolution (e.g. 300 spi by 300 spi) and that the program controls the maintenance of the alignment of the printed pixels with the array of the CCD pels.

Figure 2:
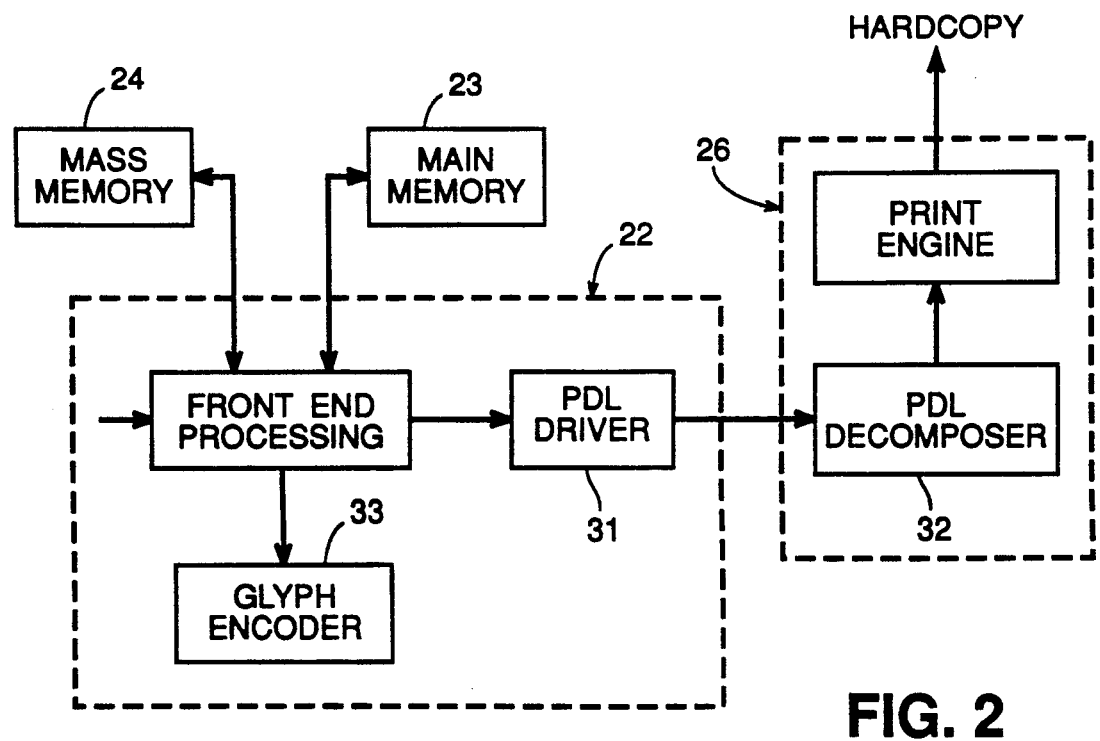
FIG. 2 is functional block diagram of a typical processor/printer interface for the document processing system shown in FIG. 1.

The printer 26, on the other hand, generally is a so-called bitmap printer for mapping the digital values of a bitmapped image file into the spatially corresponding pixels of the image it prints on a suitable recording medium, such as plain paper. The processor 22 may be configured to manipulate and store bitmapped image files and to transfer such files on demand to the printer 26. Alternatively, however, as shown in FIG. 2, the processor 22 may include a PDL (page description language) driver 31 for transferring to the printer 26 PDL descriptions of the electronic document files that are selected for printing. Thus, the printer 26 is illustrated as having a PDL decomposer 32 for decomposing such PDL descriptions to produce corresponding bit-mapped image file. Still other types of printers and processor printer interfaces will suggest themselves, but it will be assumed for purposes of the following discussion that the printer 26 is a bitmap printer that receives PDL files from the processor 22.

CODING OF DATA

Figure 3:
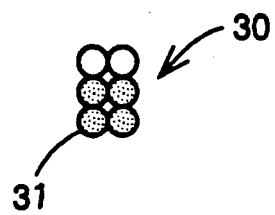
FIG. 3 is an illustration of an image cell in accordance with one embodiment of the invention.

In accordance with one aspect of the invention, the image to be printed on hardcopy is separated into cells, each of which contains a predetermined number of pixels. For example, a cell 30 may include 6 pixels arranged in a 2×3 array, as illustrated in FIG. 3. The cell is encoded by distinctively marking the pixels. For example, a predetermined number of the pixels, from 0 to 6, may be printed to be black, while the remaining pixels, if any are white. Accordingly, there are seven possible black-white combinations of the pixels of the cell. Insofar as the present invention is concerned, the specific location of the black pixels in each cell is not material, i.e. the encoding of the invention is concerned only with the number of distinctly marked pixels, and not their relative locations. The cell of FIG. 3 is thus illustrated to show a cell in which 4 of the 6 pixels are marked. It will be understood, of course, that the invention is not limited to the provision of cells of 6 pixels, and that either a greater number or a lesser number may be employed.

Figure 5:
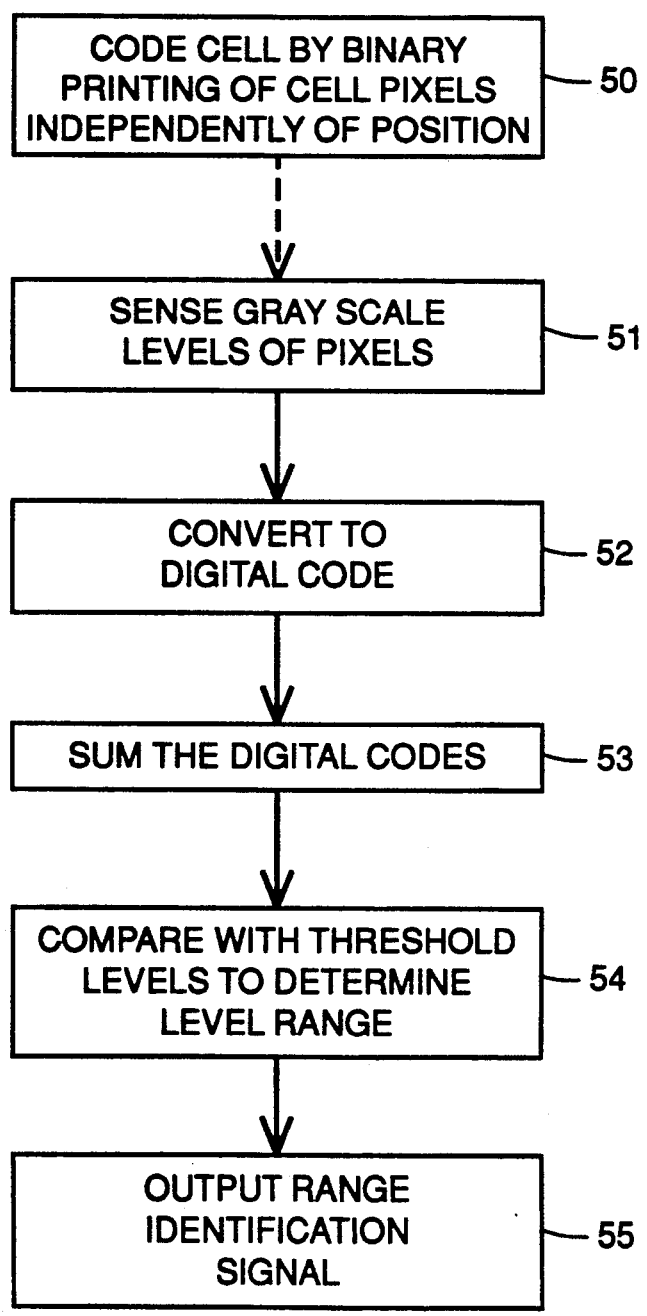
FIG. 5 is a simplified flow diagram of the method of the invention.

It will be further understood that characteristics of the marking of the marked pixels, such as their color and reflectivity, are preferably the same, i.e. there is no intentional variation in the detection characteristics of the marked pixels. For example, as illustrated in FIG. 5, in block 50 the coded image cells are preferably binary printed on the substrate or hardcopy, rather than being printed at different gray scale levels. This technique results in more robust printing, and the printed code is less sensitive to illumination and process non-uniformities.

In accordance with the invention, since a multiple pixel cell is printed with binary printing, rather than printing a single pixel cell with gray scale coding, the error rate on scanning of the cell is substantially reduced. In addition, as will be described, the invention takes advantage of the gray levels available in a scanning CCD output signal, e.g. 128 gray levels.

Figure 4:
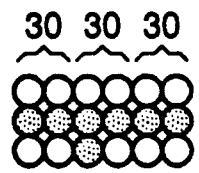
FIG. 4 is an illustration of a group of image cells in accordance with the embodiment of the invention of FIG. 3.
Figure 6:
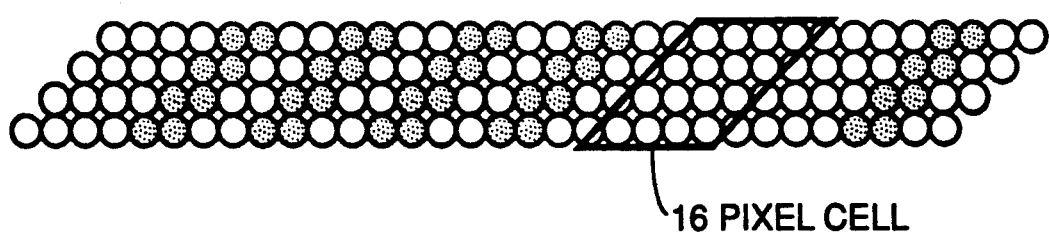
FIG. 6 is an illustration of a group of image cells in accordance with patent application Ser. No. 07/560,514 as prior art.

FIG. 4 illustrates the combination of 3 cells 30, each having 6 pixels in accordance with the arrangement of FIG. 3. Since each of the cells may correspond to any of 7 distinct non-spatially sensitive outputs, it is evident that the combination of 3 cells of FIG. 4, corresponds to any of $7^3$ different outputs, e.g. any value from 0 to 343. as a consequence, the present encoding system enables the encoding of more than the 256 ASCII character set with only 18 pixels. As will be discussed, the pixel representation of FIG. 4 may correspond to the number "121". This contrasts, for example, with the rotationally variant binary thresholding encoding scheme of application Ser. No. 560,514, as illustrated in FIG. 6, wherein it was necessary to employ 128 pixels to represent the same decimal number.

DECODING OF DATA

In accordance with the invention, multiple threshold levels of the digitized CCD output are provided for increasing the information storage density in a reliable manner. As discussed above, the output of the CCD 25A corresponds to the gray scale level of the sensed pixel, as indicated in FIG. 5 at block 51. This output is directed to an A/D converter 25B, as indicated at block 52 of FIG. 5. As an example, if the system uses an 8 bit A/D converter, the 8 bit output of the converter can represent any integer from 0 to 255. If one of the bits is discarded due to noise, the remaining 7 bits of the A/D output can represent any integer from 0 to 127.

Accordingly, in this example, the analog signal output of the CCD, corresponding to each scanned pixel, may be converted into a digital number representing any decimal value from 0 to 127.

As in the example of FIG. 3, assume that the pixels 31 of a cell 30 are arranged in a 2×3 array. As discussed above, in such an array there are 7 possible distinguishable output levels from the CCD scanning each cell (assuming that the pixels of the cell are binary marked), depending upon the number of pixels that are black (or have other distinctive marking), i.e. from 0 to 6 pixels may be black.

In accordance with the invention, in order to avoid dependence upon the sensing of each marked pixel as having a gray scale level that is either above or below a single threshold value, the digital values corresponding to all of the pixels of the cell are summed, to provide a sum S, as indicated at block 53, and the sum S of the sensed levels is tested at multiple threshold values, as indicated at block 54.

For example, if the cell of an image has N pixels, and the gray scale level of each pixel of the cell is converted to an L bit digital signal representing the gray scale level of the respective pixel, the digital signal corresponding to each pixel may have a maximum of $2^L$ different values, and the sum S of the detected levels may have a maximum value of $N \times (2^L - 1)$.

In this example, N different threshold levels are defined, separating said maximum value $N \times (2^L - 1)$ into N+1 level ranges.

Thus, in a numerical example, if the cell has 6 pixels, it has N+1=7 different black/white combinations. If the digital signal has L=7 bits, the digital signal has $2^7$ or 128 possible levels, or 0 to 127. The maximum possible sum S is then 127×6=762.

The threshold levels are selected in order to provide the maximum possibility that the range of values within which the sum S falls corresponds to the actual number of pixels that are distinctively marked (i.e. are black). In the above example, the following threshold ranges may be employed:

TABLE 1

| Threshold Level (Equal to or less than) | S Value (within the range) | Corresponding Output (Number of Black Pixels) |
|---|---|---|
| 63 | 0–63 | 6 |
| 190 | 64–190 | 5 |
| 317 | 191–317 | 4 |
| 444 | 318–444 | 3 |
| 571 | 445–571 | 2 |
| 668 | 572–668 | 1 |
| 762 | 669–762 | 0 |

As illustrated in FIG. 5, at block 54 a comparison is made between the threshold values and the sum S to determine the range into which the sum S falls, and at block 55 a signal corresponding to this determined range is output, and constitutes the decoded value of the cell.

It is noted in the example of Table 1 that the multiple threshold levels need not be equally spaced in the full range of values.

It is of course apparent that the above disclosure has been directed primarily to the explanation of the encoding method and apparatus specific to the invention, and that conventional techniques may be employed therewith in the printing of the pixels, sensing of the pixels, correction for scale or skew or the like and processing of the data.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. A method for decoding a cell of an image having a plurality of pixels, comprising:
    (a) detecting the gray scale level at each pixel of the cell an converting each of the detected gray scale levels to a digital signal representing the detected gray scale level of the respective pixel,
    (b) dividing the maximum output range of said detected gray scale levels into a plurality of contiguous signal level ranges,
    (c) summing the values of the detected digital signals corresponding to the gray scales of the pixels of the cell, and comparing said sum with a plurality of threshold levels to determine the level range within which the sum S falls, whereby the determined signal range represents the coding of the cell, and outputting a signal corresponding to said range.

2. A method for decoding a cell of an image having N pixels, comprising:
    detecting the gray scale level of each pixel of the cell and converting each of the detected gray scale levels to a L bit digital signal representing the gray scale level of the respective pixel, wherein N and L are integers; whereby the digital signal corresponding to each pixel may have a maximum of $2^L$ different values;
    summing the digital signals representing all of the pixels of the cell, whereby the resultant sum S may have maximum value of $N \times (2^L - 1)$;
    defining N different threshold levels separating said maximum value into N+1 level ranges;
    comparing said sum S with the threshold levels to determine the level range within which said sum falls; and outputting said determined level range, whereby said determined level range corresponds to the coding of pixels of said cell.

3. A method for coding information on a substrate, comprising defining an image cell of a predetermined number N of pixels on said substrate, selectively correlating information to be encoded to different numbers M from 0 to N, and distinctively marking M of said pixels on said substrate, with respect to the remaining pixels thereof, irrespective of the relative location of the marked pixels in the cell.

4. The method of claim 3 wherein said step of marking comprises binary printing said pixels on said substrate.

5. A method for encoding data on and recovering it from a substrate, comprising marking pixels of a cell on said substrate with binary printing;

sensing the gray levels of said pixels and converting the sensed levels to digital signals;

summing said digital signals, and comparing the sum thereof with a plurality of different threshold levels, to determine a range of levels within which said sum falls; and outputting a signal corresponding to said determined range.

6. An apparatus for decoding a cell of an image having a plurality of pixels, comprising:

means for detecting the gray scale level at each pixel of the cell;

means for converting each of the detected gray scale levels to a digital signal representing the detected gray scale level of the respective pixel, means for defining a plurality of threshold levels;

means for summing the values of the detected digital signals corresponding to the gray scales of the pixels of the cell;

means for comparing said sum with said threshold levels to determine a level range within which said sum falls, whereby the determined signal range represents the coding of the cell, and means for outputting a signal corresponding to said determined range.

7. An apparatus for coding information on a substrate, comprising means for defining an image cell of a predetermined number N of pixels on said substrate, means for selectively correlating information to be encoded to different numbers M from 0 to N, and means for distinctively marking M of said pixels on said substrate, with respect to the remaining pixels thereof, irrespective of the relative location of the marked pixels in the cell.

8. The apparatus of claim 7 wherein said means for marking comprises means for binary printing said pixels on said substrate.

* * * * *

UNITED STATES PATENT AND TRADEMARK OFFICE
CERTIFICATE OF CORRECTION

PATENT NO. : 5,278,400
DATED : January 11, 1994
INVENTOR(S) : James J. Appel

It is certified that error appears in the above-indentified patent and that said Letters Patent is hereby corrected as shown below:

Title page: add --[73] Assignee: Xerox Corporation, Rochester, New York--.

Signed and Sealed this

Thirteenth Day of September, 1994

Attest:

BRUCE LEHMAN

Attesting Officer    Commissioner of Patents and Trademarks